Figure 1:
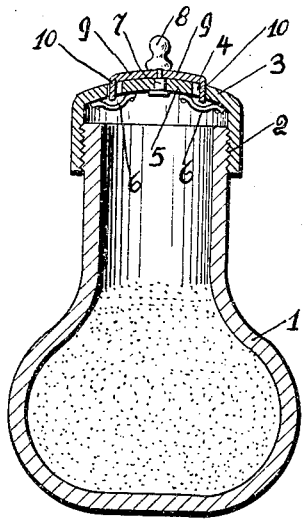

No. 792,428. PATENTED JUNE 13, 1905.
L. G. LEASE.
SALT OR PEPPER SHAKER.
APPLICATION FILED AUG. 30, 1904.

Witnesses:
K. H. Butler,
C. Klostermann.

Inventor,
L. G. Lease,
By N. C. Evert & Co.
Attorneys.

No. 792,428.                                              Patented June 13, 1905.

UNITED STATES PATENT OFFICE.

LYMAN G. LEASE, OF WARREN, OHIO.

SALT OR PEPPER SHAKER.

SPECIFICATION forming part of Letters Patent No. 792,428, dated June 13, 1905.

Application filed August 30, 1904. Serial No. 222,708.

*To all whom it may concern:*

Be it known that I, LYMAN G. LEASE, a citizen of the United States of America, residing at Warren, in the county of Trumbull and State of Ohio, have invented certain new and useful Improvements in Salt or Pepper Shakers, of which the following is a specification, reference being had therein to the accompanying drawings.

This invention has relation to salt and pepper shakers and the like, and has for its object whereby the openings formed in the shaker, through which the salt or pepper is adapted to pass, may at all times be cleansed and the salt or pepper prevented from clogging said openings.

A further object of this invention is to provide a novel form of cap which is adapted to be secured upon a receptacle in which the salt or pepper or the like is placed, and in connection with said cap I employ novel means for cleansing the openings formed in said cap whereby the salt or pepper will be prevented from clogging the same.

Briefly described, my invention consists of a cap which is adapted to be secured upon a suitable salt or pepper receptacle, this cap being provided with an annular opening, and upon the cap I pivotally mount arms which are adapted to extend into the opening. Means is provided for rotating said arms and for supporting the same, and I have so constructed my improved cap whereby the expense of manufacture will be reduced to a minimum and a strong and durable construction maintained.

The above construction will be hereinafter more fully described in detail and then specifically pointed out in the claims, and, referring to the drawing accompanying this application, like numerals of reference indicate corresponding parts throughout the several views, in which—

Figure 4:
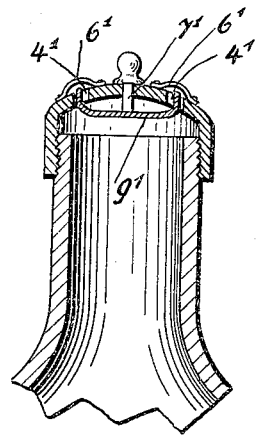
Figure 2:
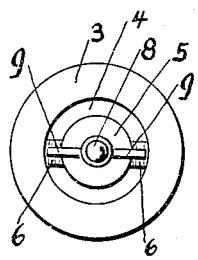
Figure 5:
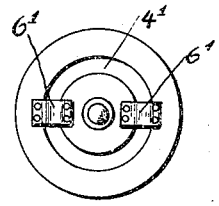
Figure 3:
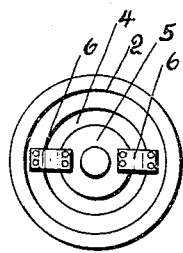
Figure 6:
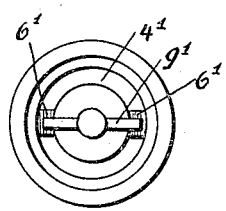

Figure 1 is a vertical sectional view of a salt and pepper shaker constructed in accordance with my invention. Fig. 2 is a top plan view of the cap of said shaker. Fig. 3 is an underneath plan view of the same. Fig. 4 is a vertical sectional view of a modified form of constructing my improved cap. Fig. 5 is a top plan view of the cap. Fig. 6 is an underneath plan view thereof.

Referring to the drawings accompanying this application, the reference-numeral 1 designates a receptacle such as commonly used for salt and pepper shakers or cellars, and my invention resides in providing a novel form of cap for said receptacle. The cap as contemplated by me is annular in form and is interiorly screw-threaded, as indicated at 2, said cap being formed of a suitable metal which will be light and durable, and in the top 3 of the cap I provide an annular slot or opening 4, and to support the central portion 5 of said cap I employ the stirrups or braces 6 6, which are secured by any desired means to the central portion 5 of the cap and the top 3 thereof. Rotatably mounted in the central portion 5 of the cap is a pin 7, which upon its upper end carries a suitable knob 8, and secured to said pin upon the upper face or top of the cap are the arms 9 9, the outer ends of which are bent downwardly, as indicated at 10 10, to engage in the annular opening or slot 4. It will be seen from this construction that by rotating the knob 8 the downwardly-bent portions 10 of the arms 9 will travel in the annular opening or slot 4 and that salt, pepper, and the like will be prevented from clogging or in any manner closing the annular slot or opening 4, and this slot may be at all times cleansed by rotating the arms 9.

In Figs. 4 to 6 of the drawings I have illustrated a modification wherein the cap is constructed similar to the cap of my preferred form, with the exception that the arms 9' are secured to the lower end of the pin 7', and these arms project upwardly into the annular slot or opening 4'. The stirrups or braces 6' 6' are mounted upon the upper face or top of the cap, as clearly illustrated in Fig. 4 of the drawings.

It will be seen from the different constructions which I have illustrated that in each instance I have provided a novel form of cap upon which means is mounted for cleansing the openings which may be formed in the cap to emit the salt or pepper carried in the receptacle, and it will of course be understood that my improved cap may be used upon such receptacles that contain powdered sugar, celery salt, and the like substances, and I do not care to limit myself to the specific construction shown, but may use any desired receptacle of a sufficient curvature or ornamentation; nor do I care to confine myself to the exact construction of the cap shown and described, but may make various changes in the details of construction, without departing from the spirit of the invention.

It will be further noted that my invention can be advantageously used for tooth-powder or any other substance of this character.

Having fully described my invention, what I claim as new, and desire to secure by Letters Patent, is—

1. A cap for salt-cellars and the like, having an annular slot formed therein, a central portion formed by said slot, and a cleaner pivoted to said central portion and extending into said slot, said cleaner capable of a complete rotation therein.

2. A cap for salt-cellars and the like formed with a circular slot, said slot forming a central portion, a cleaner pivoted to said central portion and projecting in said slot, means bridging said slot for connecting the cap and central portion, said means permitting of the complete rotation of said cleaner.

3. A cap for salt-cellars and the like formed with an annular slot, a central disk formed by said slot, cleaning-arms pivoted to said central disk and formed with projections entering the slot, and arched connections between the cap proper and the central disk permitting of the complete rotation of the cleaning-arms.

In testimony whereof I affix my signature in the presence of two witnesses.

LYMAN G. LEASE.

Witnesses:
W. A. SPILL,
JOHN FAN.